Aug. 4, 1964  S. A. SCANAVINO  3,143,077
BUOYANCY WATER LIFT
Filed April 21, 1961  7 Sheets-Sheet 2

INVENTOR.
Steven A. Scanavino
BY
Townsend and Townsend
attorneys

Aug. 4, 1964  S. A. SCANAVINO  3,143,077
BUOYANCY WATER LIFT
Filed April 21, 1961  7 Sheets-Sheet 3
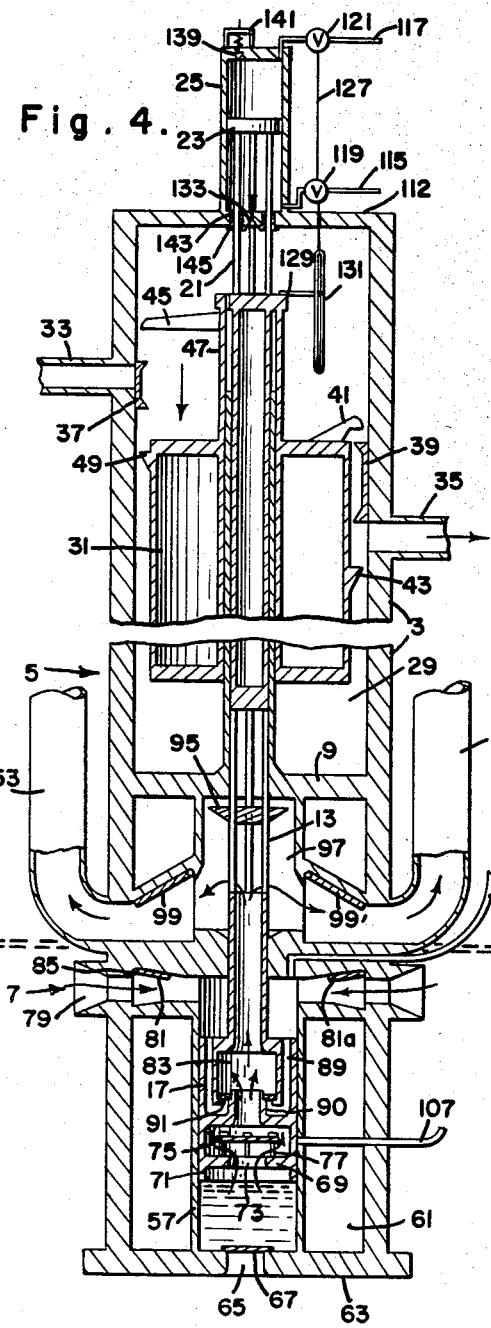
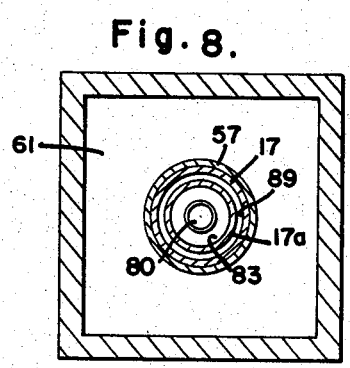
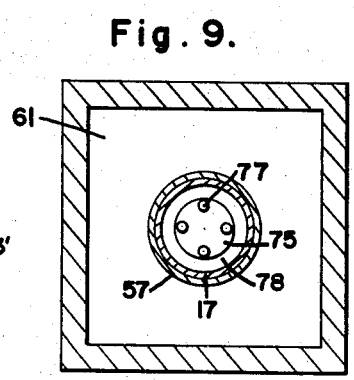
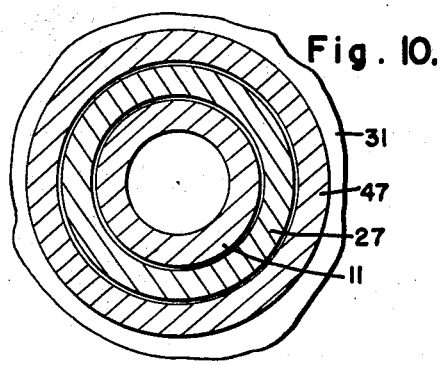
INVENTOR.
Steven A. Scanavino
BY
Townsend and Townsend
attorneys Aug. 4, 1964

S. A. SCANAVINO 3,143,077

BUOYANCY WATER LIFT

Filed April 21, 1961

INVENTOR.
Steven A. Scanavino
BY
Townsend and Townsend
attorneys

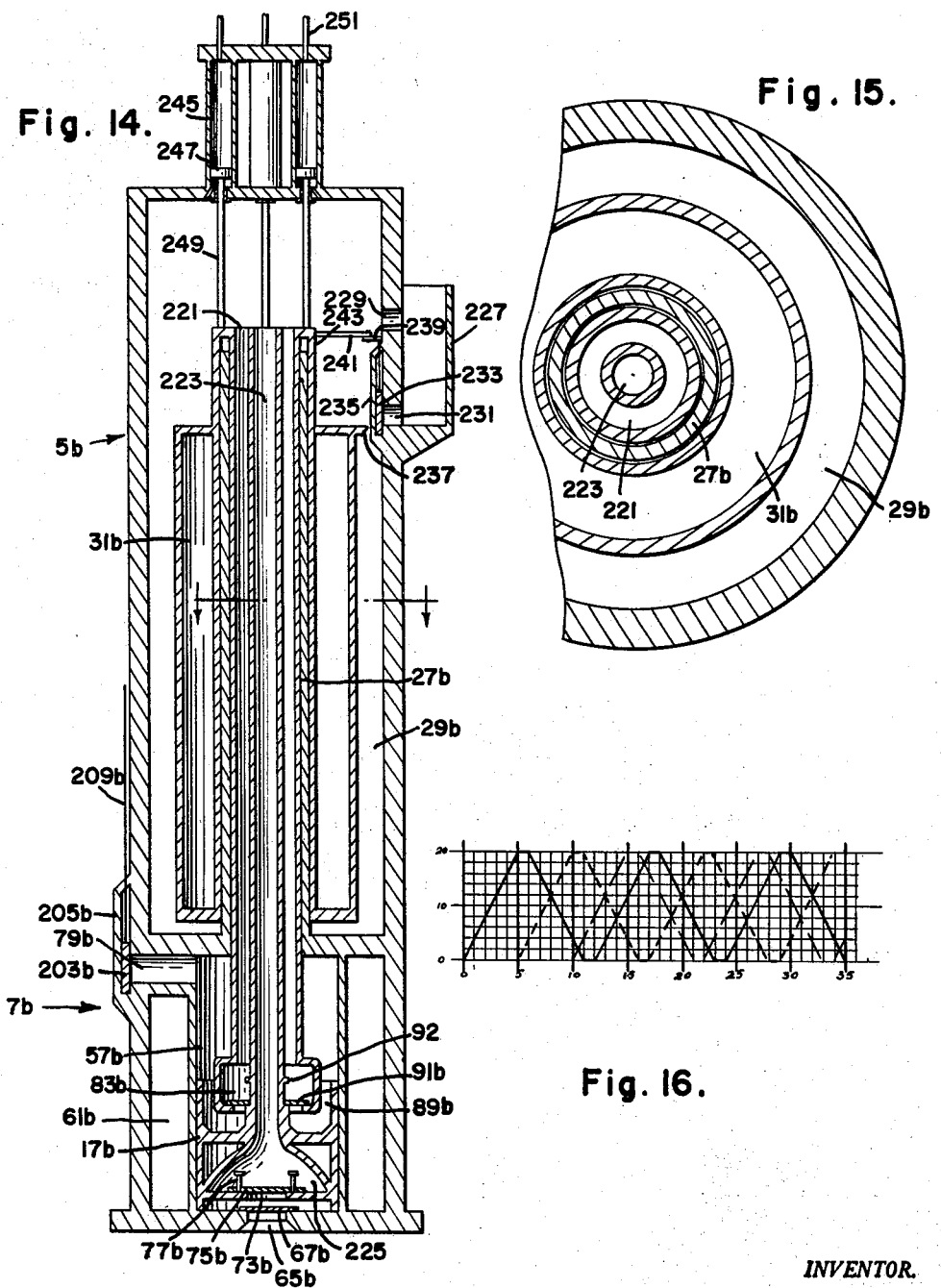

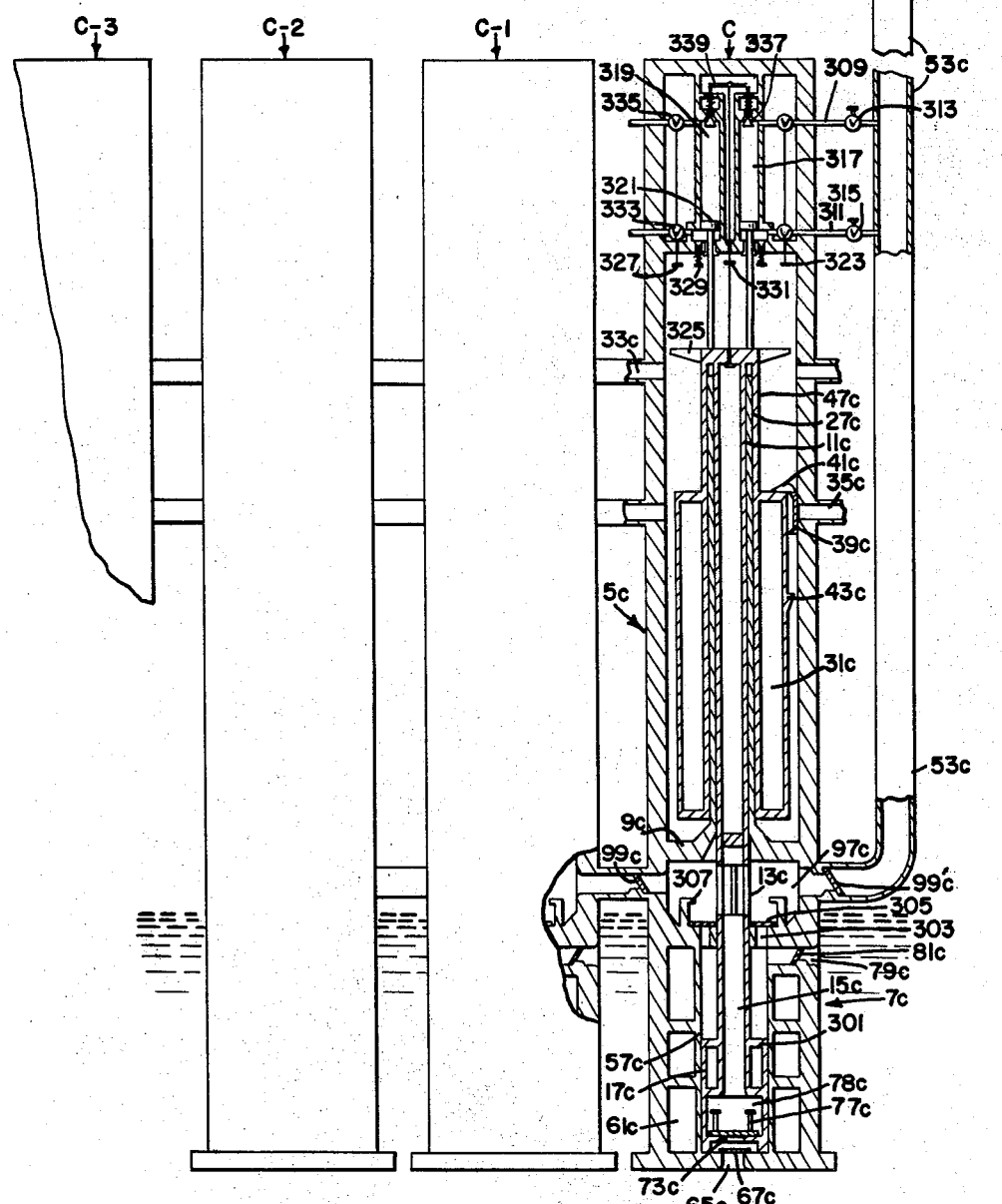

United States Patent Office

3,143,077
Patented Aug. 4, 1964

3,143,077
BUOYANCY WATER LIFT
Steven A. Scanavino, Box 716-1, Hawthorne, Nev.
Filed Apr. 21, 1961, Ser. No. 104,645
8 Claims. (Cl. 103—56)

This invention relates to new and useful improvements in devices for pumping water and other fluids, and more particularly relates to new and useful apparatus for lifting quantities of water from rivers, lakes and the like to levels substantially above the surface of the water for purposes of storage or transportation.

In certain geographic areas, water has always been a very scarce commodity and in order to satisfy its ever increasing demand, water must be transported from locations where it exists in abundance to other less favored places.

In recent years because of rapid concentration of population in certain geographic locations it has become necessary to transport large volumes of water many hundreds of miles to provide for the essential domestic, agricultural and industrial needs to which water is put and the removal of large bodies of water from their natural basins for transmission to other places is a most expensive operation.

Many contrivances for elevating water from lakes and river beds have been devised and have been quite successful in performing the task. However the devices customarily employed and with which I am familiar consume large amounts of power since they require elaborate electrical systems, including large electric motors, transformers and substations for their operation. Additionally a substantial labor force is needed for the maintenance and operation of these devices. Another difficulty resides in the fact that the pumping mechanisms of the conventional pumps are fitted with many carefully machined parts such as bearings, shafts and the like.

It is a primary object of the present invention to provide water lifting apparatus which satisfactorily performs the task of lifting large volumes of water to substantial heights above a water basin without the need of elaborate and expensive power systems. Accordingly, it has been found that by adapting the principle of buoyancy to water lifts a substantial saving results in the power required to operate the lift, thereby reducing the over-all cost of pumping and transporting water. A water lift according to the present invention provides an air filled cylinder attached to the conventional vertically reciprocating pump lift column. This cylinder occupies a large chamber filled with fluid so that displacement of the fluid by the cylinder creates buoyancy forces sufficient to balance the weight of the plunger lift column, associated water filled chamber, and the downward forces exerted by the head of a water filled discharge column at least five hundred feet in elevation.

Since the buoyancy forces are gauged to balance the above mentioned downward forces, the only additional power required by the system is that necessary to cause the water filled plunger and associated mechanism to elevate the relatively short distance measured by the stroke of the lift plunger or piston to the base of the discharge column. Since conventional systems require power to lift the water from the basin against the full pressure of the head in the discharge column, the economy of the within invention is manifest.

A feature and advantage of the invention resides in the fact that the additional power necessary to motivate the lift may be supplied simply by increasing the buoyancy forces by adding additional buoyancy fluid from a tank or reservoir in which water is stored substantially above the water level of the lake or river.

Additionally, a simple air cylinder operated by compressed air may be attached to the plunger lift column. Such means has been found to be an inexpensive method to operate the lift and one which provides a faster pumping action than obtained by adding additional buoyancy fluid.

It is a further object of the within invention to provide a water lifting device which requires a minimum of upkeep and maintenance. Accordingly, the lift of the present invention has but one main moving part, i.e. the lift column and integral plunger. Since the plunger operates in a fluid medium, friction and wear attendant friction is kept to a minimum.

Another feature and advantage of a water lift as above described resides in the fact that since elaborate power plants and the like are not required, the installation and operation of the unit are both simple and inexpensive.

A further object of the within invention is to provide a water lift of the type described which may be mounted in series with like units to provide a continuous flow of water from the water basin to the reservoir or transmission lines.

Other objects of the present invention will become apparent upon reading the following specification and referring to the accompanying drawings in which similar characters of reference represent corresponding parts in each of the several views.

In the drawings:

FIGS. 1–4 are front elevational views in section illustrating, respectively, the ratchet mechanism:
  (1) At rest;
  (2) Commencing the upward stroke;
  (3) After completion of the upward stroke; and,
  (4) Proceeding downward to complete the cycle.

FIGS. 5–9 are views taken respectively along lines 5—5 through 9—9 of FIG. 1.

Figure 1:
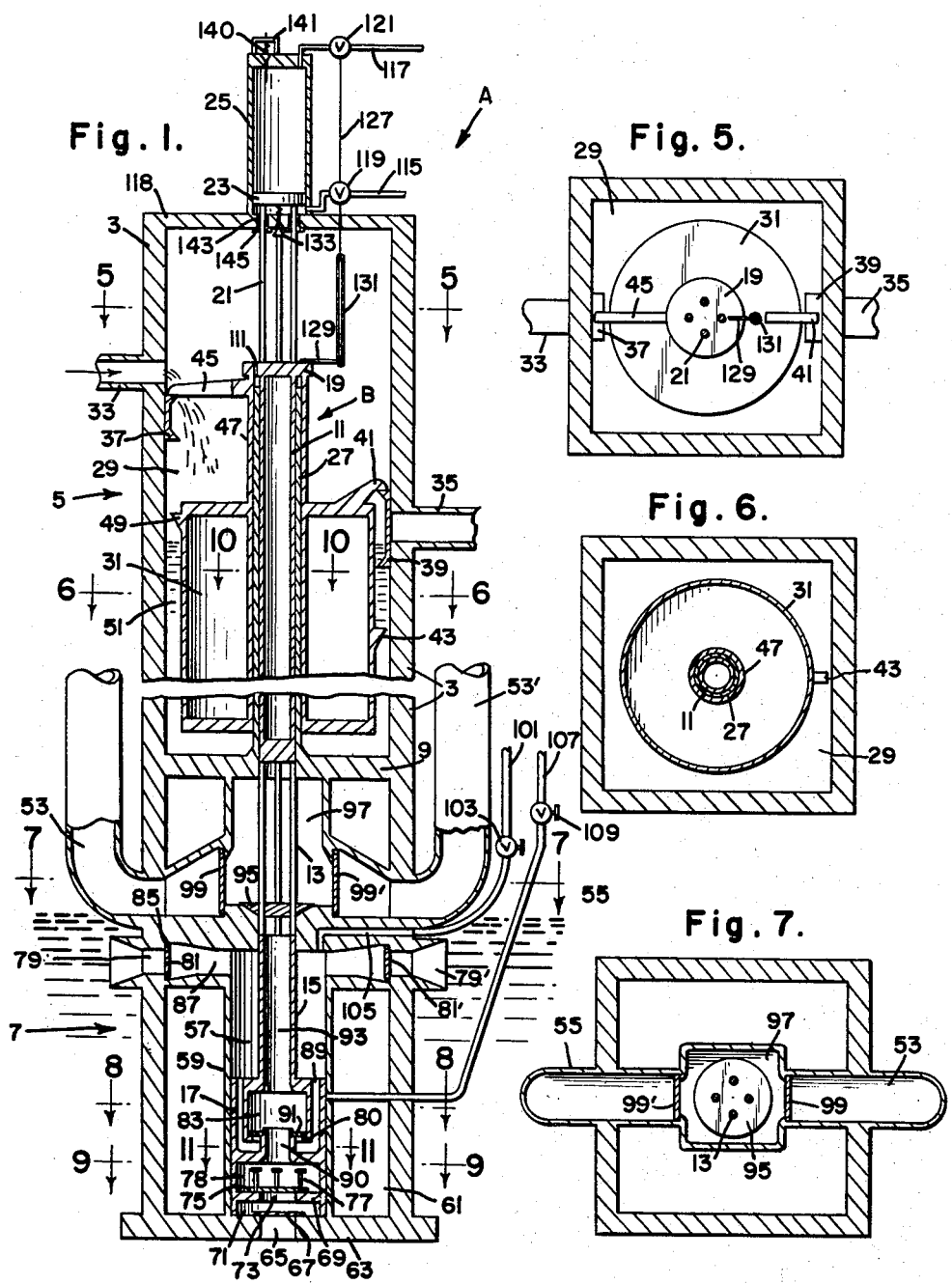
Figure 2:
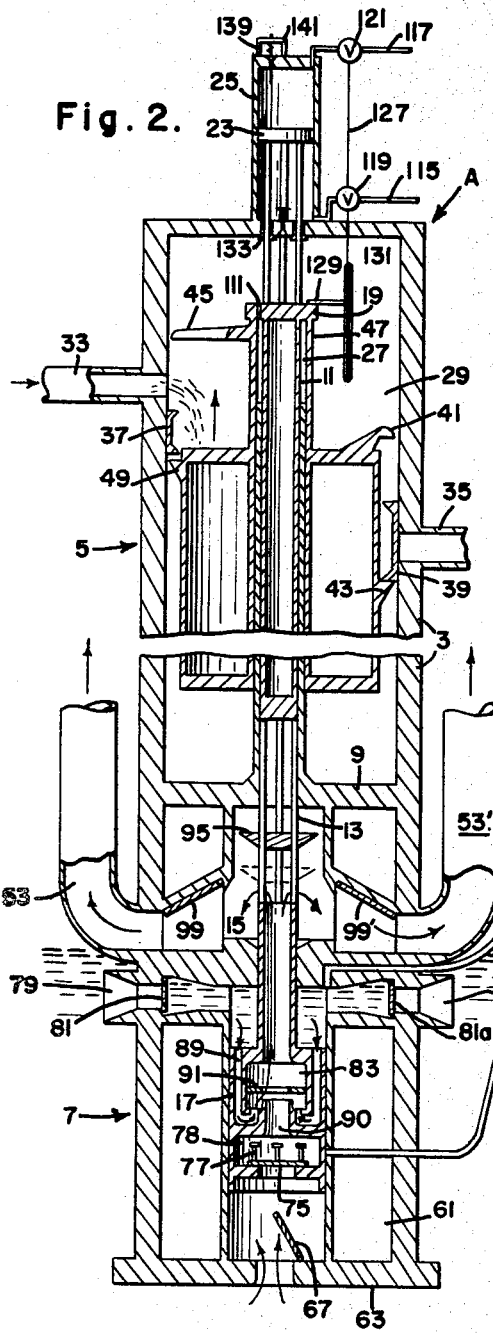
Figure 11:
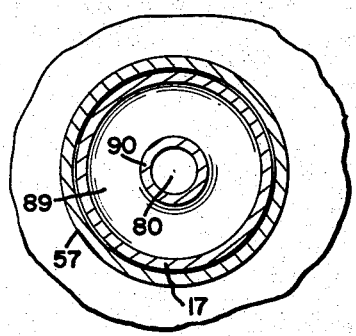

FIGS. 10 and 11 are enlarged sectional views taken along lines 10—10 and 11—11 of FIG. 1.

Figure 12:
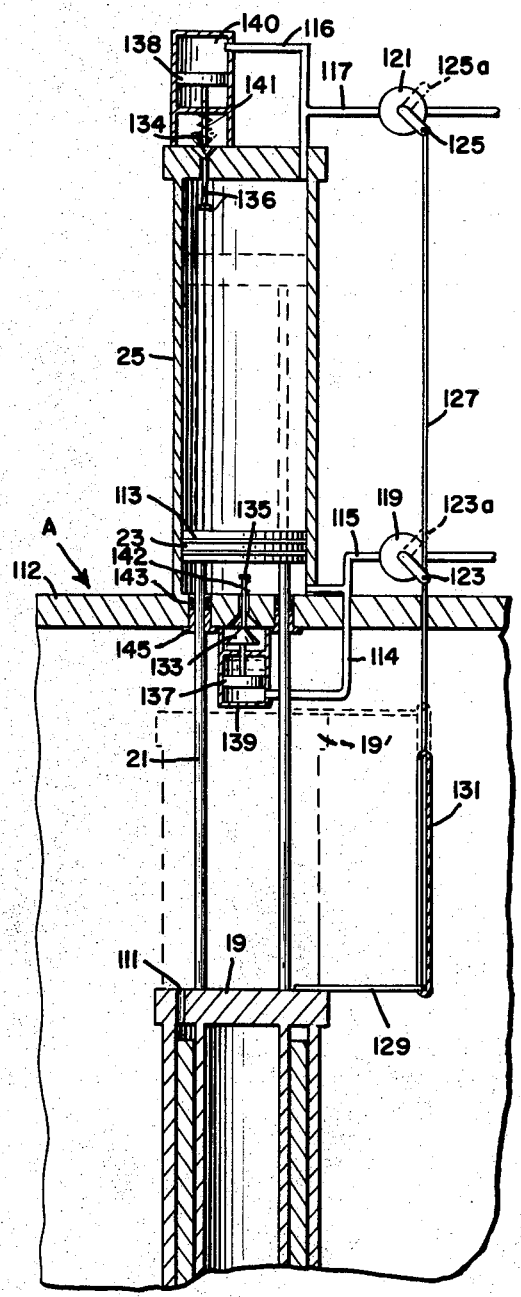

FIG. 12 is an enlarged front elevation view of the air operated cylinder and associated mechanism shown in FIG. 1.

Figure 13:
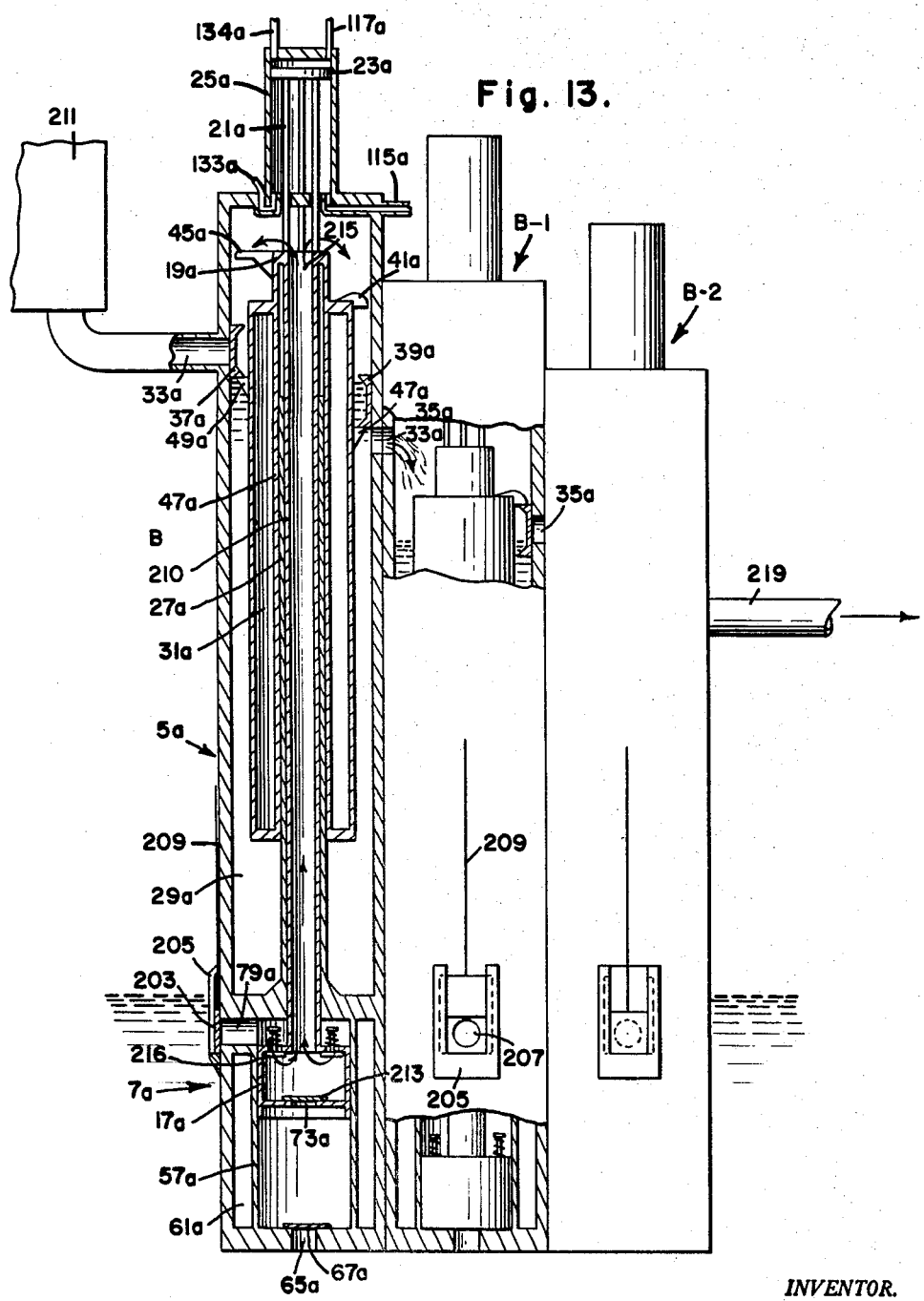

FIG. 13 is a side elevational view of a second embodiment of the invention showing three lift units mounted in series.

FIG. 14 is a side elevational view in section of a third embodiment of the invention.

FIG. 15 is a view taken along line 15—15 of FIG. 14.

FIG. 16 is a graph showing the interrelationship of the cycles of the units of FIG. 13.

FIG. 17 is a fourth embodiment of the invention and illustrates three units mounted in series.

Figure 18:
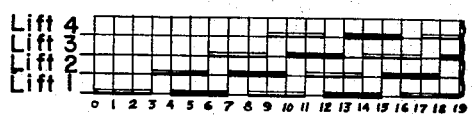

FIG. 18 is a graph illustrating the relationship between cycles of the units of FIG. 17.

Referring now more particularly to FIGS. 1–4 of the drawings, a water lift according to the within invention is indicated generally at A.

The lift includes a housing 3 divided by a partition 9 into an upper portion 5 and a lower portion 7. Mounted in the center and extending through both portions of the housing 3 is a vertically reciprocal plunger lift column B defined by an upper tubular portion 11, a middle portion comprising rods 13 and a lower tubular portion 15 integral with a lift plunger or piston 17.

At the top of the tube portion 11 is a plate 19. This plate is connected to piston rods 21 having piston 23 attached to their upper ends. The piston reciprocates in an air cylinder 25 which, as previously mentioned, may be used to provide the additional horsepower required by the unit.

A stationary sleeve 27 is shown integral with the partition 9 and this sleeve functions as a guide for the upper portion 11 of plunger lift column B and an air filled cylinder 31. Additionally sleeve 27 is a sealing means and prevents escape of fluids from buoyancy fluid chamber 29. The air filled cylinder 31 surrounds the upper portion of lift column B and is also mounted to plate 19. By this arrangement the air cylinder 31 and lift column B will move vertically together.

Communicating with the buoyancy fluid chamber 29 adjacent air cylinder 31 is a fluid inlet channel or conduit 33 and on the other side of the unit there appears a fluid discharge conduit 35, the latter being located substantially below the inlet conduit. Conduits 33 and 35 are opened and closed by means of slidable gates or valves 37 and 39. Gate 37 is actuated by arm 45 attached to the inner wall 47 of cylinder 31 just below plate 19 and by cylinder projection 49. Gate 39 is similarly moved by arm 41 and projection 43.

Figure 3:
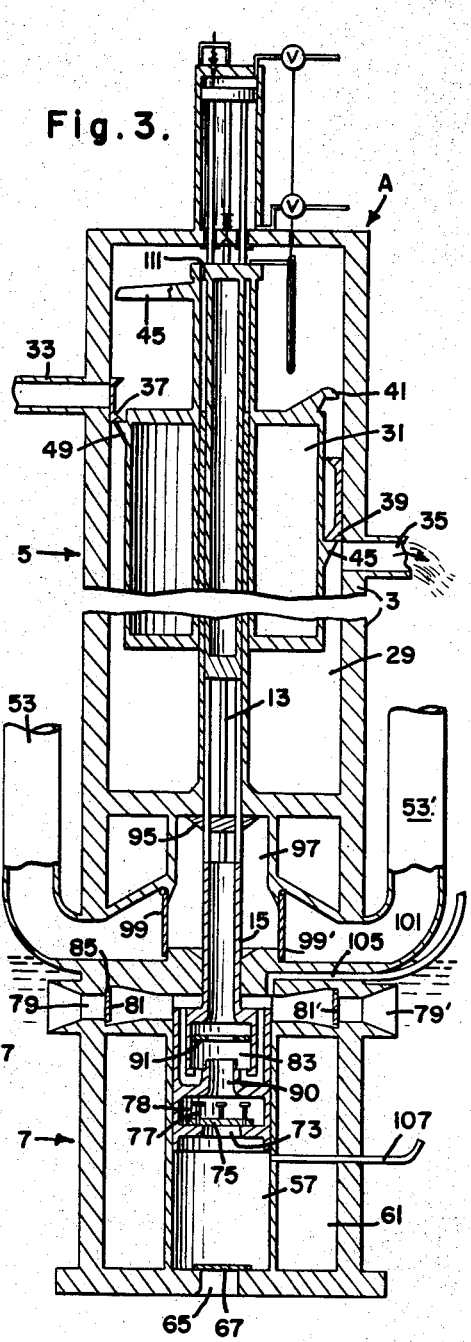

The buoyancy fluid chamber 29 is normally filled with water or other suitable fluid shown by the dotted lines at 51. This fluid will be displaced by air cylinder 31 and exerts lifting forces against the under surface of the cylinder of a magnitude sufficient to balance the weight of lift column B, the plunger 17 when filled with water, and the pressure of the water head in columns 53 and 53'. This balance is disturbed by increasing the buoyancy in chamber 29 so that the lift column B and water filled plunger 17 will rise from their neutral or at rest position shown in FIG. 1 to a discharge position as shown in FIG. 3 at which water is deposited into columns 53 and 53' from chamber 97 through gates 99 and 99'.

Columns 53 and 53', which are shown partially broken away, extend from the water level indicated at 55 to a reservoir or transmission lines which may be located as high as five hundred feet from the level of the water.

Referring now more closely to the lower portion 7 of housing 3, a chamber 61 surrounds plunger cylinder 57. This chamber may be filled with concrete or other suitable material to stabilize the unit against the influence of water currents.

Cylinder 57 defined by cylinder walls 59 receives plunger 17 and the lower portion 15 of lift column B. Water from the basin flows into the lower portion of cylinder 17 through port 65 in the base 63 of the housing by forcing hinged valve 67 upwards during upward movement of the plunger. When the plunger is on its downstroke pressure causes valve 67 to close and the cylinder water is then forced through plunger port 73 raising ring valve 75 vertically along the shafts of pins 77. When the foot 71 of the piston contacts the floor 63 of the housing thereby stopping downward movement of the plunger, valve 75 closes trapping the water inside chambers 78, passageway 90, chamber 83, and the interior 93 of column 15. Wedge valve 95 apertured to ride freely along rods 13 moves vertically from the position shown in FIG. 1 to the position shown in FIG. 3 to establish fluid communication between portion 15 of lift column B and columns 53 and 53'. On the downstroke of the lift plunger 17 wedge valve 95 drops back into the seated position shown in FIG. 1 and prevents back flow from chamber 97 into colmun 15.

Water also flows from the basin into the upper portion of cylinder 57 via channels 79 and 79' through gates 81 and 81' hinged as at 85 and via inlet chamber 87. This water enters the upper chamber 83 of piston 17 through the U-shaped circular channel 89 by elevating ring valve 91.

Briefly summarizing, when piston 17 is moving downward the water trapped in the lower portion of cylinder 57 is forced up into column 15 and fills chamber 97, exerting pressure against gates 99 and 99'. When the piston is on its upstroke, water trapped in the upper portion of cylinder 57 is pumped up into column 15 and also flows into chamber 97. Because of the forces exerted by the buoyancy, the pressure in chamber 97 will be great enough to overcome the head pressure against gates 99 and 99' when columns 53 and 53' are filled. Therefore, these gates will open forcing a volumn of water equal to the amount moved by each stroke of the plunger from the tops of columns 53 and 53' into transmission lines or storage means, not shown.

To reduce the drag created by build-up of vacuum in the lift mechanism, the lift employs a venting system to communicate certain areas of the unit with atmospheric pressure. Thus, as seen in the drawings, a tube 101 conducts air to the upper portion of cylinder 57. A valve 103 is provided to alternately open and close this communication depending upon the stroke of plunger 17. A similar tube 107 having a valve 109 channels air to the lower portion of cylinder 57 and a third vent 111 is formed in plate 19 and communicates atmosphere with the spaces between walls 47, 27 and 11, best seen in the cross sectional view of FIG. 10.

In FIG. 12 there is illustrated a detailed view of the air operated lift cylinder 25 shown in FIGS. 1–4.

Cylinder 25 is mounted on the top of plate 112 of housing 3. Inside the cylinder is a piston 23 having rings 113. The piston is attached to rods 21 which are anchored to top plate 19 of the lift mechanism. Compressed air from a source of power (not shown) enters the cylinder through lines 115 and 117. The lines have cut-off valves 119 and 121 which include pivotal arms 123 and 125 connected to control rod 127. Depending from the control rod 127 is a link 131 into which extends a horizontal bar 129.

Cylinder 25 also includes exhaust valves 133 and 134 having piston contact plates 135, 136. These valves are operated in timed relation to the opening and closing of air inlet valves 121 and 123. To prevent malfunction of the exhaust valves due to air pressure inside cylinder 26, the valves are fitted at their outer ends with pistons 137 and 138 arranged to actuate in valve cylinders 139 and 140. Branches 114 and 116 of air lines 115 and 117 apply air pressure against the exhaust valve pistons 137 and 138 which is equal to the air pressure transmitted to cylinder 25. As a result, the exhaust valves are influenced only by the action of piston 23 and valve springs 141 and 142.

In operation, air pressure first enters through the lower portion of cylinder 25 via air line 115, valve 119 normally being in open position. The piston moves upward carrying rods 21, column B and plunger 17. The horizontal bar 129 rides through the open slot in link 131 until plate 19 reaches the dotted line position shown at 19'. The link 131 is then forced upward causing pivot arm 123 to close valve 119 and pivot arm 125 to open valve 121. Air pressure then enters the top of cylinder 25 and forces the piston 23 and associated lift mechanism downward.

Suitable packing 143 and packing glands 145 are provided for rods 21.

The cylinder 25 may be used either to supplement the forces created by increasing buoyancy in chamber 29 or as the sole source of motivating the lift unit.

FIGS. 5 through 11 are cross-sectional views taken respectively along lines 5—5 through 11—11 of FIG. 1 and the various corresponding parts of FIG. 1 have been given like numbers.

The cross-sectional views of FIGS. 10 and 11 are exaggerated in order to illustrate the spacing between parts. As seen in FIG. 11, the tolerance between the outer wall of piston 17 and the inner wall of cylinder 57 is very slight thereby permitting elimination of piston rings. Since the piston operates in a fluid medium, wear due to friction is kept at a minimum.

In order to compute the total downward forces on plunger 17 to be counteracted by buoyancy forces, the following factors must be taken into account:

(1) The weight of water to be lifted by the plunger during each plunger stroke.

(2) The pressure in water filled discharge column 53.

(3) The combined weight of the plunger, the lift column 11 and the buoyancy cylinder 31.

If the plunger 17 has a diameter of 8 feet, its area will be 7,200 square inches. Then if the plunger stroke is 20 feet, the volume of water lifted each stroke will be 1,000 cubic feet having a weight of 31 tons. A discharge column 500 feet in elevation will exert a head pressure against a plunger having an area of 7,200 square inches or 774 tons, (height 500 × pounds per square inch per foot of water .43 × area of plunger 7,200 sq. inches). Then adding to this the combined weight of a plunger made of stainless steel, a lift column and a buoyancy cylinder made of aluminum and constructed according to my invention, assumed to be approximately 144 tons, the total downward force on the plunger will be 904 tons (774 plus 31 plus 99).

These downward forces may be balanced or counteracted by a buoyancy cylinder having a height of 100 feet and provided with a buoyancy lifting force surface having an area of 42,048 square inches. Since buoyancy pressure per square inch equals height×.43 or 43 pounds per square inch, the total buoyancy pressure will be 904 tons (42,048×43).

As the buoyancy merely balances these downward forces, an additional power will be required to actuate the lift mechanism and elevate the 31 tons of weight (8,000 gallons) 20 feet for deposit in the water filled discharge column.

The additional horsepower necessary to raise this weight may be determined according to the following formula:

Horsepower equals cubic feet of water to be pumped (1,000) × weight of 1 cubic foot of water (62 pounds) × lift in feet (20) divided by 33,000 equals 37.5 horsepower per minute.

This additional power is supplied by compressed air, and since 20 horsepower is required to compress 100 cubic feet of air to 100 pounds per square inch pressure, 45 horsepower will be needed to furnish a 48-inch air cylinder the required compressed air. In other words a total of 80.5 horsepower is needed to operate a lift according to the within invention by compressed air based upon a one minute stroke. Since it is contemplated that each stroke of the within invention will take about 4 minutes, the lift will require approximately 54 horsepower (37.5 divided by 4 plus 45).

Without the buoyancy factor, the lift would require a power input necessary to raise the lift water the full height of the 500 foot column. If the figure 500 is used in place of the figure 20 in the above formula it will be seen that 900 horsepower is required for a one minute stroke, or 225 horsepower for a 4 minute stroke, an amount substantially in excess of that required by the present invention.

Turning now to FIG. 13, there is illustrated a second embodiment of the within invention indicated generally at B and mounted in series with two other like units B-1 and B-2 in which each unit has a different elevation.

The parts of this embodiment either alike or substantially similar to those of the first embodiment have been given like reference numbers followed by the letter "a."

Referring to the lower portion 7a of unit B, a water inlet gate 203 is arranged to open and close communication between conduit 79a and the outside body of water. Gate 203 slideably engages a U-shaped bracket 205 surrounding port 207 and is connected at its upper end to a line 209 in circuit with a source of air power (not shown) which will raise and lower gate 203 in a sequence timed to the stroke of plunger 17. As is obvious, the gate may be actuated by electric power if desired.

Buoyancy fluid is transmitted to the unit through intake conduit 33a from a source such as a tank or reservoir 211 shown schematically in the drawing. The unit is constructed and arranged so that normal buoyancy forces exerted against the bottom of buoyancy cylinder 31 will balance the weight of the vertically movable parts when filled with water. The water carrying movable parts include the plunger 17a and the lift column 215.

When additional buoyancy fluid is added through inlet 33a, plunger 17 which has been filled with water entering through port 65a and hinged gate 67a and plunger port 73a through hinged gate 213, is caused to flow into the lift discharge tube 215. On the downstroke of the plunger 17a, gate 203 opens admitting water through conduit 79a causing spring actuated valves 216 to open. When plunger 17a is on its upstroke, the lower portion of the cylinder 57a fills with water and as the piston proceeds downward, water from the lower portion of the cylinder is forced up through gate 213 and into column 215. The water in tube 215 is discharged from the top, as indicated by the arrows, and spills into chamber 29a. As gate 39a is opened when the column 215 and associated plunger 17a are in the up position, the excess fluid in chamber 29a will flow through discharge port 35a into unit B-1 disturbing its balance and causing this unit to actuate in a manner similar to unit B. Likewise, unit B-2 will be actuated by B-1 to create a constant flow of water through discharge line 219.

As in the case of the embodiment of FIG. 1, the motive power for the units of FIG. 13 may be supplemented or wholly supplied by air cylinder 25a. This cylinder, which functions in substantially the same manner as its counterpart in FIG. 1, includes a piston 23a attached to rods 21a which in turn are secured to top plate 19a of the lift mechanism. 115a and 117a represent air intake conduits in circuit with a source of compressed air (not shown) and suitable exhaust means is shown at 133a and 134a. While not illustrated in detail, it will be understood that cylinder 25a operates in much the same manner as that of FIG. 12.

As shown in the drawing, each lift unit has a different elevation to permit the discharge port 35a of the first unit to coincide with the inlet port 33a of the unit next adjacent.

FIG. 16 represents in graph form the relationship of the cycles of the FIG. 13 units. The cycle of the plunger of unit B is shown in solid lines, the cycle of unit B-1 is shown in broken lines, and the cycle of unit B-2 is shown in semi-solid lines. The vertical column terminating in the numeral 20 represents the height of the stroke of each piston and horizontal line ending in the numeral 35 represents time in minutes.

Turning now to FIG. 14, there is illustrated a third embodiment of the invention in which like parts have been given like numerals followed by the letter "b."

Referring to the lower portion 7b of FIG. 14, there is shown a cylinder 57b communicating with the water basin by means of port 65b and hinged valve 67b. At the upper portion of the cylinder is a conduit 79b having a slideable gate 203b mounted in U-shaped bracket 205.

In this embodiment, the plunger 17b and associated discharge means are different. The water which fills the lower portion of cylinder 57b enters the lower chamber 225 by elevating gate 75b which rides on pins 77b. The water is then routed directly into lift column 223. Water entering the upper portion of cylinder 57b is routed into upper chamber 83b via circular channel 89b and through ring valve 91b which engages stop 92. This water then flows through tubular sleeve 221. In operation, when plunger 17 is on its downstroke, water in the lower portion of cylinder 57b will flow through column 223 and when the plunger is on its upstroke, water in the upper portion of the cylinder will be pumped through separate column 221. The advantage of this arrangement is in the reduction of water turbulence.

The upper portion 5b of the lift unit includes an intake and discharge conduit 227 shown communicating with inlet port 229 and discharge port 231. These ports are alternately opened and closed by the gate 233 slideably mounted in U-shaped bracket member 235. Gate 233 is actuated upward by projection 237 on the buoyancy cylinder which contacts arm 239, and downward by contacting arm 241 attached to the upper portion 243 of the buoyancy cylinder wall.

The buoyancy fluid chamber 29b and the buoyancy cylinder 31b function in the same manner as described in respect to the first embodiment.

Compressed air is utilized in this embodiment in much the same manner as in prior embodiments. However, in place of a single cylinder and piston three smaller cylinder and piston units 245 may be mounted in parallel on top of the lift. In this fashion the lifting forces may be evenly applied to the lift columns and plunger. Pistons 247 are shown connected to rods 249. Each cylinder includes air intake means 251 communicating compressed air from a source (not shown) to the top of the cylinders and similar air intake means (not shown) will supply compressed air to the lower portion of each of the cylinders. Packing 257 is provided for the piston rods and appropriate exhaust means may be included to communicate the upper and lower portions of each cylinder with atmospheric pressure.

FIG. 15 represents a cross-sectional view taken along line 15—15 of FIG. 14. Parts corresponding to those of FIG. 14 have received like reference numerals and the figure is exaggerated to indicate the spacing between parts.

Referring now to FIG. 17, there is illustrated another embodiment of the within invention and in which four units C-C-3 are shown mounted in series. This embodiment is basically the same as that of FIG. 1 and corresponding parts have been given like numerals of reference followed by the letter "c."

As seen in the drawings, when the plunger 17c is on its downstroke water enters from outside unit C through gate 81c and into the upper portion of cylinder 57c where it rests on plate 301 of plunger 17c. As the plunger proceeds through its downstroke, water from the lower portion of cylinder 57c is pumped into column 15c.

When the plunger is on its upstroke, the water in the upper portion of the cylinder is forced through channel 303 causing ring valve 305 to elevate in guide 307 and is then filled into chamber 97c. From chamber 97c the water flows into column 53c.

The units of FIG. 17 have intercommunicating inlet and discharge lines 33c and 35c and each unit is equal in height.

The units are motivated by means of hydraulic cylinders 317 and 319 similar in construction to the air operated cylinders of prior embodiments.

Water pressure is communicated from discharge column 53c to the upper and lower portions of the cylinders 317 and 319 via lines 309 and 311 having cutoff valves 313 and 315 which may either be hand or mechanically operated.

When the pistons 321 are moved to the top of their stroke yoke 325 will contact, valve actuating means 327, exhaust valve means 329 and disk 331. Simultaneously, the inlet valves 333 become closed and inlet valves 335 are opened. As seen from the drawing, the exhaust valves 337 attached to bracket 339 are similarly operated by yoke 325.

When the yoke is out of pressure engagement with its various mentioned contacts, an opposite switching effect takes place.

FIG. 18 graphically illustrates the relationship of the strokes of the four unit system shown in FIG. 17. The thin ilnes illustrate upward strokes and the heavy lines the downward strokes. From the graph it may be seen that three lifts are always moving water while one lift is reversing its stroke. Thus, a continuous flow system is provided which is equal to the capacity of three lift units. It is estimated that each unit will require three minutes to accomplish each stroke and one minute to reverse.

Although the foregoing invention has been described in some detail by way of illustration and example for purposes of clarity of understanding, it is understood that certain changes and modifications may be practiced within the spirit of the invention and scope of the appended claims.

What is claimed is:

1. In a water lifting device for lifting water from a water basin to an elevation substantially above the surface of the basin and including a housing member having a lift column and a water fillable plunger mounted for vertical reciprocal movement within the housing at the lower end thereof and including water inlet means communicating with the basin water, outlet means for discharging water therefrom, and valve means associated with said inlet and outlet means for controlling water flow, the improvements comprising: A fluid discharge means in communication with said plunger for receiving water therefrom and discharging same at an elevation substantially above the surface of the water basin; a water fillable buoyancy chamber formed in the upper portion of said housing; a cylindrical buoy mechanically connected to the upper portion of said lift column for movement therewith and being partially submerged in said buoyancy chamber, said water fillable plunger being slidably mounted with the lower end of said lift column and having connection for reciprocal movement with said buoy, said cylindrical buoy having a height and a buoyancy lifting force area sufficient to create a buoyancy equal to the combined weight of said lift column, water filled plunger and the water in said discharge means; water lift actuating means for alternately moving said water filled plunger to plunger discharge position and plunger filling position.

2. A water lifting device according to claim 1 in which said discharge means comprises at least one upward extending tubular column mounted exteriorly of said housing and in fluid communication with said plunger.

3. A water lifting device according to claim 1 and wherein said water lift actuating means comprises a fluid inlet in said housing communicating said buoyancy chamber with a source of water above said basin for increasing buoyancy in said chamber; a fluid outlet at an elevation lower than said inlet for decreasing buoyancy in said chamber and means to alternately open and close said inlet and outlet.

4. A water lifting device according to claim 1 and in which said water lift actuating means comprises an air operated motor communicating with a source of compressed air and mechanically connected to said buoy for vertically moving said buoy.

5. A water lifting device according to claim 1 and in which said buoyancy chamber includes an inner wall interposed between the outer wall of said lift column and the inner wall of said buoy for guiding the vertical reciprocal movement of said lift column and buoy in watertight relationship.

6. In a water lifting system the improvements comprising: a plurality of water lifting units in which each said unit is in fluid communication and has its cycle in phase with the unit next adjacent, each said unit comprising a water lifting device including a housing member having a lift column; a water fillable plunger mounted for vertical reciprocal movement in said housing and including water inlet means communicating with the basin water, outlet means for discharging water therefrom and valve means associated with said inlet and outlet means for controlling water flow; a fluid discharge means in communication with said plunger outlet means for receiving water therefrom and discharging same at an elevation substantially above the surface of the water basin; a water filled buoyancy chamber formed in the upper portion of said housing; a cylindrical buoy connected to said lift column for movement therewith and partially submerged in said buoyancy chamber, said cylindrical member having a volume displacement sufficient to create a buoyancy equal to the combined weight of said lift column, water filled plunger and the water in said discharge means; water lift actuating means for alternately moving said water filled plunger to discharge position and plunger filling position, said discharge means establishing the fluid communication between all but the last unit in the system and a compressed air motor connected to said buoy for exerting vertical directive forces upon said buoy to speed the operating cycle.

7. In a water-lifting system for lifting water from a water basin to an elevation substantially above the surface of the basin: a hollow vertical support column having a pressure-actuated inlet valve at the lower portion thereof, first horizontal wall means dividing said column into an upper and lower chamber, each chamber being sealed from the other in watertight relationship; a lift cylinder, vertically mounted within said lower chamber communicating with the inlet valve, valved discharge means having a passageway extending through said support column to the upper end of said lift cylinder, plunger means slidably mounted within said lift cylinder, buoy means mounted within said upper chamber for vertical movement therein, water lift actuating means comprising an upper and a lower valve passageway, said upper passageway being connected to a water reservoir to supply water to float the buoy, said buoy being coupled to both said valve passageways to open said upper passageway when the buoy is at a first lowermost position, and to simultaneously close the upper valve passageway and open said lower valve passageway when the buoy reaches a second uppermost position, vertical shaft means extending through said first wall means in watertight relationship being connected at the upper end to said buoy and at the lower end to said plunger, and air motor means connected for vertically moving the buoy whereby the plunger is raised as the buoy is floated and the water raised by the plunger is forced to the valved discharge means wehrein the valve discharge means is closed and in that water enters the lift cylinder as the valve inlet means opens when the buoy starts vertically downward.

8. In a water-lifting device comprising a vertical housing member, wall means dividing the vertical housing into an upper and lower chamber, a lift column vertically mounted within the lower chamber of said housing member, plunger means slidably mounted within said lift column, said upper chamber haing an upper valve buoyancy water inlet and a lower valved buoyancy water outlet, a buoy enclosed within said upper chamber for vertical movement therein, mechanical coupling between said buoy and said plunger for moving said buoy and plunger in unison, water discharge passageway communicating with said lift column, and compressed air driven piston and chamber means secured vertically above said upper chamber having mechanical means connected to said buoy whereby an increase in buoyancy water volume in the upper chamber will cause the buoy to float and a decrease in buoyancy water volume causes the buoy to move vertically downward thus moving the plunger upward and downward accordingly to pump lift water into the discharge means wherein the compressed air piston will direct vertical forces on the buoy to cause said buoy to move up and down at an accelerated cyclic rate.

References Cited in the file of this patent
UNITED STATES PATENTS

| | | |
|---|---|---|
| 211,168 | Loudon | Jan. 7, 1879 |
| 291,340 | Harvey | Jan. 1, 1884 |
| 348,076 | Warth | Aug. 24, 1886 |
| 657,355 | Nagler | Sept. 4, 1900 |
| 1,036,328 | Pierce | Aug. 20, 1912 |
| 2,073,833 | Bothezat | Mar. 16, 1937 |
| 2,360,139 | Johnstone | Oct. 10, 1944 |